United States Patent
Luo et al.

(10) Patent No.: US 9,837,931 B2
(45) Date of Patent: Dec. 5, 2017

(54) PHASED LOCK LOOP CONTROL FOR MULTIPLE INVERTERS CONNECTED TO A POLYPHASE GRID

(71) Applicants: Hunan University, Changsha (CN); Changsha Boli Electric Corporation, Changsha (CN)

(72) Inventors: An Luo, Changsha (CN); Yandong Chen, Changsha (CN); Mingyue Wang, Changsha (CN); Qingchang Zhong, Sheffield (GB); Leming Zhou, Changsha (CN); Yuan Huang, Changsha (CN); Zhiyong Chen, Changsha (CN); Xiaoping Zhou, Changsha (CN); Huimin Kuang, Changsha (CN); Mingshen Li, Changsha (CN)

(73) Assignees: Hunan University, Changsha (CN); Changsha Boli Electric Corporation, Changsha (CN)

( * ) Notice: Subject to any disclaimer, the term of this patent is extended or adjusted under 35 U.S.C. 154(b) by 0 days.

(21) Appl. No.: 15/307,809

(22) PCT Filed: Sep. 15, 2014

(86) PCT No.: PCT/CN2014/086501
§ 371 (c)(1),
(2) Date: Oct. 28, 2016

(87) PCT Pub. No.: WO2015/165191
PCT Pub. Date: Nov. 5, 2015

(65) Prior Publication Data
US 2017/0047862 A1    Feb. 16, 2017

(30) Foreign Application Priority Data

Apr. 30, 2014 (CN) .......................... 2014 1 0181861

(51) Int. Cl.
*H02J 3/48* (2006.01)
*H02M 7/5387* (2007.01)
(Continued)

(52) U.S. Cl.
CPC .......... *H02M 7/53871* (2013.01); *H02J 3/38* (2013.01); *H02J 3/48* (2013.01); *H02M 7/5395* (2013.01);
(Continued)

(58) Field of Classification Search
CPC ................... H02M 7/49; H02M 7/521; H02M 7/7525–7/7529; H02J 2003/388; H02J 3/46–3/50
See application file for complete search history.

(56) References Cited

U.S. PATENT DOCUMENTS 6,122,184 A    9/2000  Enjeti et al.
2011/0026281 A1*  2/2011  Chapman .................. H02J 3/38
                                                            363/65
(Continued)

FOREIGN PATENT DOCUMENTS

CN    102222931 A    10/2011
CN    102185341 B    1/2013
(Continued)

*Primary Examiner* — Harry Behm
*Assistant Examiner* — Peter Novak
(74) *Attorney, Agent, or Firm* — Mauriel Kapouytian Woods LLP; Michael Mauriel

(57) ABSTRACT

A steady state control method for a three-phase double-mode inverter. Off-grid steady state control is composed of outer loop power droop control, voltage feed-forward quasi-resonant control, and inner current loop dead-beat control. Therefore, the response speed of the inverter is raised, and the influence caused by the load fluctuation of a micro-grid is inhibited. Based on the off-grid steady state control, grid-connected steady state control introduces phase lead
(Continued)

control to the power droop control. Therefore, the output voltage of the inverter is always slightly ahead of the power grid voltage, which avoids the energy pour backward phenomenon of the inverter due to a phase error, and realizes stable and reliable running in the grid-connected mode.

1 Claim, 1 Drawing Sheet

(51) Int. Cl.
  *H02J 3/38*     (2006.01)
  *H02M 7/5395*   (2006.01)
  *H02M 1/12*     (2006.01)
  *H02M 7/48*     (2007.01)

(52) U.S. Cl.
  CPC .... *H02M 1/126* (2013.01); *H02M 2007/4815* (2013.01); *Y02B 70/1441* (2013.01)

(56) References Cited

U.S. PATENT DOCUMENTS

| | | | |
|---|---|---|---|
| 2016/0327914 A1* | 11/2016 | Feron Longmoor | ... G04F 1/005 |
| 2016/0336673 A1* | 11/2016 | Eromaki | ............... G06F 13/409 |
| 2017/0133947 A1* | 5/2017 | Fu | ......................... H02M 7/487 |

FOREIGN PATENT DOCUMENTS

| | | |
|---|---|---|
| CN | 102447268 B | 7/2013 |
| CN | 103078545 B | 2/2015 |
| CN | 103944190 B | 2/2016 |

* cited by examiner

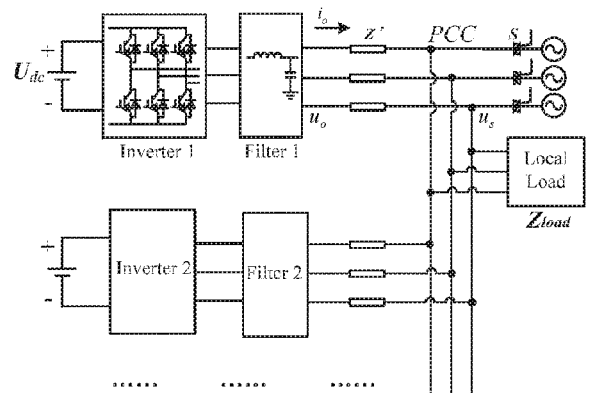
Fig. 1
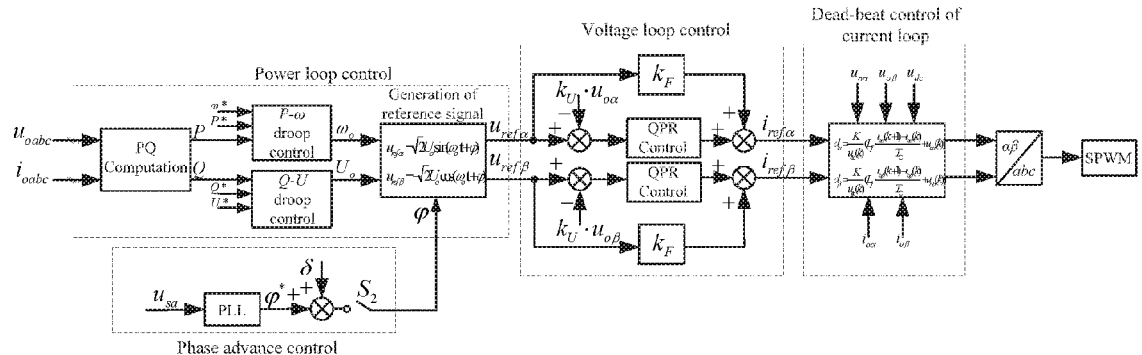
Fig. 2
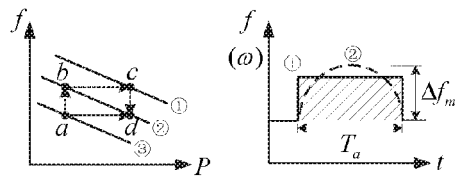
Fig. 3 (a)   Fig. 3 (b)
Fig. 3

PHASED LOCK LOOP CONTROL FOR MULTIPLE INVERTERS CONNECTED TO A POLYPHASE GRID

FIELD OF THE INVENTION

The present invention relates to the field of micro-grid distributed power generation, in particular to a steady-state control method of a three-phase dual-mode inverter.

BACKGROUND OF THE INVENTION

It is an effective way to solve the current energy crisis and environmental deterioration by micro-grid acceptance and using of distributed power (photovoltaic power, wind power, fuel cells and the like), where an inverter in the micro-grid is used as an interface of the distributed power and the micro-grid to convert distributed energy into high-quality electric energy, therefore researches on inverters which are suitable for the operation of the micro-grid is of great significance. The current researches mainly focus on control methods when the inverters work in a grid-connected mode or an off-grid (island) mode separately, but for inverters capable of working in the grid-connected and off-grid dual-mode, researches on corresponding smooth switch control thereof are not perfect.

In a highly flexible micro-grid, the inverter should have the ability to simultaneously provide electric energy to a local load and the power grid, and the inverter can be disconnected from the power grid and directly supply power to the local load under exceptional conditions. During grid-connected switch, instant overvoltage or over current will be generated because the micro-power source and the power grid cannot be strictly synchronized and differences exist in control schemes; during off-grid switch, the three phases of a thyristor (SCR) or a solid-state relay (SSR) cannot be cut off at the same time, resulting in imbalance in voltage or current, so that the fluctuation of active or reactive power is increased to cause instability of a DC-side voltage. These factors influence the normal work of the load and break the reliability and stability of power supply. The existing dual-mode inverters generally adopt P/Q control at the grid-connected mode and adopt V/f control at the off-grid mode. Although transition control is adopted to inhibit the impact of the output current of the inverter in a switching process, only the fluctuation of the output voltage, current and power of the inverter is concerned, but the reduction of the impact of the grid current is not taken into account. The droop control at the grid-connected mode and the off-grid mode can achieve steady-state control of the system and guarantee the equipartition of load and power. But for dual-mode switching control, only the existing smooth switching mode can be depended on, and smooth switching cannot be carried out according to the characteristics of droop control, thereby lacking pertinence.

SUMMARY OF THE INVENTION

The technical problem to be solved in the present invention is to provide a steady-state control method of a three-phase dual-mode inverter, in order to solve the shortcomings in the prior art, overcome the control defects of the existing dual-mode inverters, and solve the energy pour backward phenomenon of inverters in micro-grids at the grid-connected mode caused by phase errors to guarantee the operation stability of systems.

To solve the above technical problems, the present invention adopts the following technical solutions: a steady-state control method of a three-phase dual-mode inverter, applicable to a micro-grid dual-mode inverter parallel system; the said micro-grid dual-mode inverter parallel system includes a plurality of dual-mode inverters, a grid-connected/off-grid switch, a three-phase grid and an inverter control circuit; each dual-mode inverter includes a DC energy storage capacitor, a three-phase inverter circuit, an inverter control circuit and an LC filter circuit, the DC energy storage capacitor, the three-phase inverter circuit and the LC filter circuit are connected in sequence, the LC filter circuit is connected with a line impedor, the line impedor is connected with the grid-connected/off-grid switch through an AC bus, and the grid-connected/off-grid switch is accessed to the three-phase grid; the inverter control circuit includes a sampling and conditioning circuit, a phase locked loop circuit, a controller and a driving and protection circuit; the input end of the sampling and conditioning circuit is connected with the LC filter circuit; the controller is connected with the input end of the driving and protection circuit, the output end of the sampling and conditioning circuit and the output end of the phase locked loop circuit; and the input end of the phase locked loop circuit is connected with the AC bus; the said steady-state control method of a three-phase dual-mode inverter includes an off-grid steady-state control method and a grid-connected steady-state control method;

the off-grid steady-state control method is as follows:

1) at the starting point of each sampling period, the sampling and conditioning circuit is used to sample voltage $u_{sa}$ of the three-phase gird, voltage $u_{dc}$ of the DC energy storage capacitor, capacitor voltages $u_{oa}$, $u_{ob}$, $u_{oc}$ of the LC filter circuit, line currents $i_{oa}$, $i_{ob}$, $i_{oc}$, and grid currents $i_{sa}$, $i_{sb}$, $i_{sc}$, then the sampling data are sent to the controller for processing, where the effective values of the sampling data are calculated, and the capacitor voltages $u_{oa}$, $u_{ob}$ and $u_{oc}$ of the LC filter circuit are converted into capacitor voltages $u_{o\alpha}$ and $u_{o\beta}$ of the LC filter circuit under $\alpha\beta$ coordinate, while the line currents $i_{oa}$, $i_{ob}$ and $i_{oc}$ of the LC filter circuit are converted into line currents $i_{o\alpha}$ and $i_{o\beta}$ of the LC filter circuit under $\alpha\beta$ coordinate;

2) the capacitor voltages $u_{oa}$, $u_{ob}$ and $u_{oc}$ of the LC filter circuit are multiplied by the line currents $i_{oa}$, $i_{ob}$ and $i_{oc}$ respectively to obtain active power P and reactive power Q of the dual-mode inverter;

3) droop control operations are carried out on reference value U* of the output voltage amplitude, reference value ω* of angular frequency, reference value P* of active power, reference value Q* of reactive power and above-mentioned active power P and reactive power Q of the dual-mode inverter to obtain output voltage amplitude $U_o$ and angular frequency $\omega_o$ of the dual-mode inverter, wherein, in the grid-connected mode, ω* and U* are real-time values of angular frequency and amplitude of the grid voltage respectively which vary with the change of the grid voltage; and in the off-grid mode, ω* and U* are set values of angular frequency and amplitude of the grid voltage respectively;

4) reference voltages $u_{ref\alpha}$ and $u_{ref\beta}$ under $\alpha\beta$ coordinate are calculated using effective value $U_o$ of the output voltage, angular frequency $\omega_o$ and output voltage phase $\phi$ of the dual-mode inverter as follows, wherein t is sampling time:

$$\begin{cases} u_{ref\alpha} = \sqrt{2}\, U_o \sin(\omega_o t + \varphi) \\ u_{ref\beta} = -\sqrt{2}\, U_o \cos(\omega_o t + \varphi) \end{cases};$$

5) product of $u_{o\alpha}$ and feedback coefficient $k_U$ and product of $u_{o\beta}$ and feedback coefficient $k_U$ are respectively subtracted from $u_{ref\,\alpha}$ and $u_{ref\,\beta}$ and the obtained differences are served as inputs of the quasi-resonance QPR controller, wherein value range of the feedback coefficient $k_U$ is 0.1-2;

6) reference voltage feed-forward sections $k_F \cdot u_{ref\,\alpha}^*$ and $k_F \cdot u_{ref\,\beta}^*$ are introduced and added with the outputs of the quasi-resonance QPR controller respectively to obtain reference values $i_{ref\,\alpha}$ and $i_{ref\,\beta}$ of line currents, wherein $k_F$ is voltage feed-forward coefficient with value range of 0.01-5;

7) dead-beat control of current is carried out on reference values $i_{ref\,\alpha}$ and $i_{ref\,\beta}$ of line currents, the capacitor voltages $u_{o\alpha}$ and $u_{o\beta}$ of the LC filter circuit and the voltage $u_{dc}$ of the DC energy storage capacitor to obtain controlled variables $d_\alpha$ and $d_\beta$ of the switch tube of the three-phase inverter circuit:

$$\begin{cases} d_\alpha = \dfrac{2K}{u_{dc}(k)} \cdot \left( L_f \cdot \dfrac{i_{o\alpha}^*(k+1) - i_{o\alpha}(k)}{T_c} + u_{o\alpha}(k) \right) \\ d_\beta = \dfrac{2K}{u_{dc}(k)} \cdot \left( L_f \cdot \dfrac{i_{o\beta}^*(k+1) - i_{o\beta}(k)}{T_c} + u_{o\beta}(k) \right) \end{cases};$$

wherein, K is controlled variable constant that K is larger than 0 and smaller than 1, $L_f$ is inductance value of the LC filter circuit, $T_c$ is PWM carrier period, $u_{dc}(k)$ is voltage on DC side of the dual-mode inverter sampled at k moment, $u_{o\alpha}(k)$ and $u_{o\beta}(k)$ are capacitor voltages of the LC filter circuit under $\alpha\beta$ coordinate sampled at k moment, $i_{o\alpha}(k)$ and $u_{o\beta}(k)$ are line currents under $\alpha\beta$ coordinate sampled at k moment, and $i_{o\alpha}^*(k+1)$ and $i_{o\beta}^*(k+1)$ are predicted reference values of the line currents under $\alpha\beta$ coordinate sampled at k+1 moment;

8) coordinate transformation are carried out on $d_\alpha$ and $d_\beta$ to obtain controlled variables $d_a$, $d_b$ and $d_c$ of the switch tube of the three-phase inverter circuit under abc coordinate under steady-state control;

9) bipolar modulation are carried out on $d_a$ and triangular carrier, $d_b$ and triangular carrier as well as $d_c$ and triangular to obtain duty cycle signal of the switch tube of the three-phase inverter circuit which is used to control the on-off of the switch tube of the three-phase inverter circuit through the driving and protection circuit;

the grid-connected steady-state control method is as follows:

the output voltage phase according to step 4) of the above-mentioned off-grid steady-state control method is adjusted to $\phi^*+\delta$, and the on-off of the switch tube of the three-phase inverter circuit is controlled according to step 1) to step 9) of the above-mentioned off-grid steady-state control method, wherein, $\phi^*$ is voltage phase of the three-phase grid detected by the phase locked loop circuit, $\delta=\delta_0 \pm \Delta\delta$, with the value range of $\delta_0$ is 0.0001-0.15, $\Delta\delta$ is phase compensation parameter with its calculation formula of $$\Delta\delta = \arctan\frac{I_{o1}X' + I_{s1}X''}{U_o + I_{o1}R' + I_{s1}R''} - \arctan\frac{I_{o2}X' + I_{s2}X''}{U_o + I_{o2}R' + I_{s2}R''};$$

wherein, $I_{o1}$ and $I_{s1}$ are effective values of output current and grid current of the dual-mode inverter after power change respectively, $I_{o2}$ and $I_{s2}$ are effective values of output current and grid current of the dual-mode inverter before power change respectively, R' is line impedance between the dual-mode inverter and the AC bus, X' is inductive reactance between the dual-mode inverter and the AC bus, and R is line impedance between the local load and the AC bus, X" is inductive reactance between the local load and the AC bus.

Compared with the prior art, the present invention has the following beneficial effects: the present invention provides a steady-state control strategy of the dual-mode inverter, the steady-state control is composed of outer loop power droop control, voltage feed-forward quasi-resonant control and inner current loop dead-beat control, and the steady-state control at the grid-connected/off-grid mode is achieved. Since the output voltage of the inverter at the grid-connected mode is always slightly ahead of the grid voltage, phase advance control is introduced into the present invention to avoid the energy pour backward phenomenon of the inverter at the grid-connected mode caused by phase errors, and the micro-source is guaranteed to continuously convey energy to the grid, and stable and reliable operation at the grid-connected mode is achieved. The steady-state control method disclosed by the present invention can be widely applied to micro-grid control systems, and effects in high-power systems are particularly excellent.

BRIEF DESCRIPTION OF THE DRAWINGS

FIG. 1 is a schematic diagram of a micro-grid dual-mode inverter parallel structure in an embodiment of the present invention;

FIG. 2 is a block diagram of steady-state control of a dual-mode inverter in an embodiment of the present invention;

FIG. 3 is a schematic diagram of output frequency change of an inverter in an embodiment of the present invention;

FIG. 3(a) shows sag curve change during power change;

FIG. 3(b) shows frequency and phase changes.

DETAILED DESCRIPTION OF THE EMBODIMENTS

FIG. 1 is a schematic diagram of a micro-grid dual-mode inverter parallel structure in an embodiment of the present invention. The micro-grid dual-mode inverter parallel structure mainly includes a full-bridge inverter circuit, a filter, a local load, a grid-connected/off-grid switch, a grid, etc. A distributed power is converted into DC with a constant voltage, and the voltage is $U_{dc}$; the DC is converted into AC by a three-phase PWM inverter circuit; the filter is used for filtering burrs caused by a high-frequency switch, and $u_o$ and $i_o$ represent output voltage and current of the inverter after passing through the filter; the AC is output to provide electric energy to the local load $Z_{load}$, and the grid-connected/off-grid switch S is used for connecting a micro-source with the grid. Wherein, the voltage of a point of common connection (PCC) is $u_s$, and the grid voltage mentioned in the present invention refers to the voltage at the PCC.

FIG. 2 is a block diagram of steady-state control of a dual-mode inverter in an embodiment of the present invention. In the figure, $k_U$ represents a voltage feedback parameter, $k_F$ represents a reference voltage feed-forward parameter, $\phi$ represents an output voltage phase, and $\delta$ represents an advanced grid voltage phase of the inverter. The dual-mode steady-state control method includes:

1) at the starting point of each sampling period, the sampling and conditioning circuit is used to sample voltage $u_{sa}$ of the three-phase gird, voltage $u_{dc}$ of the DC energy storage capacitor, capacitor voltages $u_{oa}$, $u_{ob}$, $u_{oc}$ of the LC filter circuit, line currents $i_{oa}$, $i_{ob}$, $i_{oc}$, and grid currents $i_{sa}$, $i_{sb}$, $i_{sc}$, then the sampling data are sent to the controller for processing, where the effective values of the sampling data are calculated, and the capacitor voltages $u_{oa}$, $u_{ob}$ and $u_{oc}$ of the LC filter circuit are converted into capacitor voltages $u_{o\alpha}$ and $u_{o\beta}$ of the LC filter circuit under $\alpha\beta$ coordinate, while the line currents $i_{oa}$, $i_{ob}$ and $i_{oc}$ of the LC filter circuit are converted into line currents $i_{o\alpha}$ and $i_{o\beta}$ of the LC filter circuit under $\alpha\beta$ coordinate;

2) the capacitor voltages $u_{oa}$, $u_{ob}$ and $u_{oc}$ of the LC filter circuit are multiplied by the line currents $i_{oa}$, $i_{ob}$ and $i_{oc}$ respectively to obtain active power P and reactive power Q of the inverter;

3) droop control operations are carried out on reference value U* of the output voltage amplitude, reference value ω* of angular frequency, reference value P* of active power, reference value Q* of reactive power and above-mentioned active power P and reactive power Q of the inverter to obtain output voltage amplitude $U_o$ and angular frequency $\omega_o$ of the inverter, wherein, in the grid-connected mode, ω* and U* are real-time values of angular frequency and amplitude of the grid voltage respectively which vary with the change of the grid voltage; and in the off-grid mode, ω* and U* are set values of angular frequency and amplitude of the grid voltage respectively;

4) in the off-grid mode, the output voltage phase φ of the inverter is zero. In the grid-connected mode, the phase of the grid voltage detected by a phase locked loop circuit is φ*, an phase lead angle δ is obtained by phase lead control, and then at this time, the output voltage phase φ is equal to:

φ=φ*+δ

5) reference voltages $u_{ref\alpha}$ and $u_{ref\beta}$, under $\alpha\beta$ coordinate are calculated using effective value $U_o$ of the output voltage, angular frequency $\omega_o$ and output voltage phase φ of the dual-mode inverter as follows, wherein t is sampling time:

$$\begin{cases} u_{ref\alpha} = \sqrt{2}\, U_o \sin(\omega_o t + \varphi) \\ u_{ref\beta} = -\sqrt{2}\, U_o \cos(\omega_o t + \varphi) \end{cases};$$

6) product of $u_{o\alpha}$ and feedback coefficient $k_U$ and product of $u_{o\beta}$ and feedback coefficient $k_U$ are respectively subtracted from $u_{ref\alpha}$ and $u_{ref\beta}$, and the obtained differences are served as inputs of the quasi-resonance QPR controller, wherein value range of the feedback coefficient $k_U$ is 0.1-2;

7) reference voltage feed-forward sections $k_F \cdot u_{ref\alpha}^*$ and $k_F \cdot u_{ref\beta}^*$ are introduced and added with the outputs of the quasi-resonance QPR controller respectively to obtain reference values $i_{ref\alpha}$ and $i_{ref\beta}$ of line currents, wherein k is voltage feed-forward coefficient with value range of 0.01-5;

8) dead-beat control of current is carried out on reference values $i_{ref\alpha}$ and $i_{ref\beta}$ of line currents, the capacitor voltages $u_{o\alpha}$ and $u_{o\beta}$ of the LC filter circuit and the voltage $u_{dc}$ of the DC energy storage capacitor to obtain controlled variables $d_\alpha$ and $d_\beta$ of the switch tube of the three-phase inverter circuit:

$$\begin{cases} d_\alpha = \dfrac{2K}{u_{dc}(k)} \cdot \left( L_f \cdot \dfrac{i_{o\alpha}^*(k+1) - i_{o\alpha}(k)}{T_c} + u_{o\alpha}(k) \right) \\ d_\beta = \dfrac{2K}{u_{dc}(k)} \cdot \left( L_f \cdot \dfrac{i_{o\beta}^*(k+1) - i_{o\beta}(k)}{T_c} + u_{o\beta}(k) \right) \end{cases};$$

wherein, K is controlled variable constant that K is larger than 0 and smaller than 1, $L_f$ is inductance value of the filter, $T_c$ is PWM carrier period, $u_{dc}(k)$ is voltage on DC side of the dual-mode inverter sampled at k moment, $u_{o\alpha}(k)$ and $u_{o\beta}(k)$ grid voltages under $\alpha\beta$ coordinate sampled at k moment, $i_{o\alpha}(k)$ and $i_{o\beta}(k)$ are output currents of the inverter under $\alpha\beta$ coordinate sampled at k moment, and $i_{o\alpha}^*(k+1)$ and $i_{o\beta}^*(k+1)$ are reference currents under $\alpha\beta$ coordinate sampled at k+1 moment;

9) coordinate transformation are carried out on $d_\alpha$ and $d_\beta$ to obtain controlled variables $d_a$, $d_b$, and $d_c$ of the switch tube of the under abc coordinate under steady-state control;

10) bipolar modulation are carried out on $d_a$ and triangular carrier, $d_b$ and triangular carrier as well as $d_c$ and triangular to obtain duty cycle signal of a fully controlled power device, wherein $d_a$, $d_b$ and $d_c$ are SPWM modulated wave signals, and the duty cycle signal is used to control the on-off of the fully controlled power device through the driving and protection circuit;

According to the said steady-state control strategy of the dual-mode inverter, in step 4), the phase lead control section was added in the grid-connected steady-state control. The inverter should be ahead of the grid for a very small phase δ to guarantee the normal energy flow between the micro-source and the power grid and avoid the energy pour backward phenomenon of the inverter caused by phase errors. The phase δ needs to be changed when the output power change. Adjustment of the phase δ can guarantee the control accuracy and reinforce the stability of the inverter in the grid-connected mode. The calculation formula of the phase δ is:

δ=δ₀±Δδ

When the output power need to be increased, "+" is taken in the above formula; and when the output power need to be decreased, "−" is taken in the above formula, wherein, the value range of an initial value $δ_0$ is 0.0001-0.15, which is related to the rated power of the dual-mode inverter. Δδ represents a phase compensation parameter and is related to the output power of the inverter, with its calculation formula of:

$$\Delta\delta = \arctan\dfrac{I_{o1}X' + I_{s1}X''}{U_o + I_{o1}R' + I_{s1}R''} - \arctan\dfrac{I_{o2}X' + I_{s2}X''}{U_o + I_{o2}R' + I_{s2}R''};$$

wherein, $I_{o1}$ and $I_{s1}$ are effective values of output current and grid current of the dual-mode inverter after power change respectively, $I_{o2}$ and $I_{s2}$ are effective values of output current and grid current of the dual-mode inverter before power change respectively, R' is line impedance between the dual-mode inverter and the AC bus, X' is inductive reactance between the dual-mode inverter and the AC bus, and R is line impedance between the local load and the AC bus, X" is inductive reactance between the local load and the AC bus.

FIG. 3 is a schematic diagram of output frequency change of an inverter in an embodiment of the present invention. FIG. 3(a) shows sagging curve change during power change and FIG. 3(b) shows changes of frequency and phase. No matter the local load is inductive or capacitive, the output voltage of the inverter is ahead of the grid voltage due to transmission line impedance and other reasons. Therefore, the phase should be always ahead of the phase of the grid to guarantee the micro-source to continuously convey energy to the grid without generating backward flowing.

In the grid-connection mode, the phase of the micro-source is slightly ahead of the phase of the grid, which is conducive to the power flow, and the phase locked loop does not act on droop control and only provides real-time frequency and phase references. As shown in FIG. 3(a), it is taken as an example that the output power is increased. When the output power needs to be increased, the droop characteristic curve needs to be changed from point a to point d on the condition of keeping the frequency invariant. It can be seen from FIG. 3(b) that, when the output voltage is invariant, the phase difference between the micro-source and the power grid needs to be increased because the current is increased. Nearly a period needs to be delayed if the time delay strategy is adopted to change the phase angle, and a large number of harmonic waves will be introduced in the duration, and the phase angle cannot be changed by frequent time delay. In the present invention, the phase angle is changed by changing the frequency.

The droop coefficient is kept invariant in the adjustment process. According to the droop characteristic curve as shown in FIG. 3(a), the working point is changed from a to b when the frequency of the micro-source is increased, where only the rated frequency needs to be changed, while the output power is invariant; when the frequency is kept at the maximum value, the rated frequency is increased, and the working point is changed from b to c; and finally, the working point is changed from c to d, where the output power of the micro-source can be increased and the phase can be adjusted to guarantee invariant frequency before and after the phase is adjusted only by changing the rated frequency in this way and no harmonic wave will be introduced by such adjustment. The frequency should be kept within a range of 49.8-50.2 Hz when it is changed.

When the power of the inverter needs to be changed in the grid-connected mode, it can be seen from the vector relation that, the phase lead angle δ needs to be adjusted. Assuming that the phase to be adjusted is Δδ, phase lead adjustment is carried out by adjusting frequency in the present invention to avoid system oscillation caused by direct frequency change. Instant frequency output changes according to the following formula:

$$f = f_o \pm \frac{\Delta\delta}{4T_a}\sin\left(\frac{\pi}{T_a}t\right) (0 < t < T_a)$$

wherein, $T_a$ represents an adjustment time, and $f_o$ represents the output frequency of the system before adjustment. "+" is taken in the above formula when the output power need to be increased; and "−" is taken in the above formula when the output power need to be decreased.

The invention claimed is:

1. A steady-state control method of a three-phase dual-mode inverter, applicable to a micro-grid dual-mode inverter parallel system; the said micro-grid dual-mode inverter parallel system includes a plurality of dual-mode inverters, a grid-connected/off-grid switch, a three-phase grid and an inverter control circuit; each dual-mode inverter includes a DC energy storage capacitor, a three-phase inverter circuit, an inverter control circuit and an LC filter circuit, the DC energy storage capacitor, the three-phase inverter circuit and the LC filter circuit are connected in sequence, the LC filter circuit is connected with a line impedor, the line impedor is connected with the grid-connected/off-grid switch through an AC bus, and the grid-connected/off-grid switch is accessed to the three-phase grid; the inverter control circuit includes a sampling and conditioning circuit, a phase locked loop circuit, a controller and a driving and protection circuit; the input end of the sampling and conditioning circuit is connected with the LC filter circuit; the controller is connected with the input end of the driving and protection circuit, the output end of the sampling and conditioning circuit and the output end of the phase locked loop circuit; and the input end of the phase locked loop circuit is connected with the AC bus; wherein the said steady-state control method of a three-phase dual-mode inverter includes an off-grid steady-state control method and a grid-connected steady-state control method;

the off-grid steady-state control method is as follows:
1) at the starting point of each sampling period, the sampling and conditioning circuit is used to sample voltage $u_{sa}$ of the three-phase gird, voltage $u_{dc}$ of the DC energy storage capacitor, capacitor voltages $u_{oa}$, $u_{ob}$, $u_{oc}$ of the LC filter circuit, line currents $i_{oa}$, $i_{ob}$, $i_{oc}$, and grid currents $i_{sa}$, $i_{sb}$, $i_{sc}$, then the sampling data are sent to the controller for processing, where the effective values of the sampling data are calculated, and the capacitor voltages $u_{oa}$, $u_{ob}$ and $u_{oc}$ of the LC filter circuit are converted into capacitor voltages $u_{o\alpha}$ and $u_{o\beta}$ of the LC filter circuit under αβ coordinate, while the line currents $i_{oa}$, $i_{ob}$ and $i_{oc}$ of the LC filter circuit are converted into line currents $i_{o\alpha}$ and $i_{o\beta}$ of the LC filter circuit under αβ coordinate;
2) the capacitor voltages $u_{oa}$, $u_{ob}$ and $u_{oc}$ of the LC filter circuit are multiplied by the line currents $i_{oa}$, $i_{ob}$ and $i_{oc}$ respectively to obtain active power P and reactive power Q of the dual-mode inverter;
3) droop control operations are carried out on reference value U* of the output voltage amplitude, reference value ω* of angular frequency, reference value P* of active power, reference value Q* of reactive power and above-mentioned active power P and reactive power Q of the dual-mode inverter to obtain output voltage amplitude $U_o$ and angular frequency $\omega_o$ of the dual-mode inverter, wherein, in the grid-connected mode, ω* and U* are real-time values of angular frequency and amplitude of the grid voltage respectively which vary with the change of the grid voltage; and in the off-grid mode, ω* and U* are set values of angular frequency and amplitude of the grid voltage respectively;
4) reference voltages $u_{ref\,\alpha}$ and $u_{ref\,\beta}$ under αβ coordinate are calculated using effective value $U_o$ of the output voltage, angular frequency $\omega_o$ and output voltage phase φ of the dual-mode inverter as follows, wherein t is sampling time:

$$\begin{cases} u_{ref\,\alpha} = \sqrt{2}\,U_o\sin(\omega_o t + \varphi) \\ u_{ref\,\beta} = -\sqrt{2}\,U_o\cos(\omega_o t + \varphi) \end{cases};$$

5) product of $u_{o\alpha}$ and feedback coefficient $k_U$ and product of $u_{o\beta}$ and feedback coefficient $k_U$ are respectively subtracted from $u_{ref\,\alpha}$ and $u_{ref\,\beta}$, and the obtained differences are served as inputs of the quasi-resonance QPR controller, wherein value range of the feedback coefficient $k_U$ is 0.1-2;
6) reference voltage feed-forward sections $k_F \cdot u_{ref\,\alpha}^*$ and $k_F \cdot u_{ref\,\beta}^*$ are introduced and added with the outputs of the quasi-resonance QPR controller respectively to obtain reference values $i_{ref\,\alpha}$ and $i_{ref\,\beta}$ of line currents, wherein $k_F$ is voltage feed-forward coefficient with value range of 0.01-5;

7) dead-beat control of current is carried out on reference values $i_{ref\,\alpha}$ and $i_{ref\,\beta}$ of line currents, the capacitor voltages $u_{o\alpha}$ and $u_{o\beta}$ of the LC filter circuit and the voltage $u_{dc}$ of the DC energy storage capacitor to obtain controlled variables $d_\alpha$ and $d_\beta$ of the switch tube of the three-phase inverter circuit:

$$\begin{cases} d_\alpha = \dfrac{2K}{u_{dc}(k)} \cdot \left(L_f \cdot \dfrac{i^*_{o\alpha}(k+1) - i_{o\alpha}(k)}{T_c} + u_{o\alpha}(k)\right) \\ d_\beta = \dfrac{2K}{u_{dc}(k)} \cdot \left(L_f \cdot \dfrac{i^*_{o\beta}(k+1) - i_{o\beta}(k)}{T_c} + u_{o\beta}(k)\right) \end{cases};$$

wherein, K is controlled variable constant that K is larger than 0 and smaller than 1, $L_f$ is inductance value of the LC filter circuit, $T_c$ is PWM carrier period, $u_{dc}(k)$ is voltage on DC side of the dual-mode inverter sampled at k moment, $u_{o\alpha}(k)$ and $u_{o\beta}(k)$ are capacitor voltages of the LC filter circuit under $\alpha\beta$ coordinate sampled at k moment, $i_{o\alpha}(k)$ and $i_{o\beta}(k)$ are line currents under $\alpha\beta$ coordinate sampled at k moment, and $i^*_{o\alpha}(k+1)$ and $i^*_{o\beta}(k+1)$ are predicted reference values of the line currents under $\alpha\beta$ coordinate sampled at k+1 moment;

8) coordinate transformation are carried out on $d_\alpha$ and $d_\beta$ to obtain controlled variables $d_a$, $d_b$ and $d_c$ of the switch tube of the three-phase inverter circuit under abc coordinate under steady-state control;

9) bipolar modulation are carried out on $d_a$ and triangular carrier, $d_b$ and triangular carrier as well as $d_c$ and triangular to obtain duty cycle signal of the switch tube of the three-phase inverter circuit which is used to control the on-off of the switch tube of the three-phase inverter circuit through the driving and protection circuit;

the grid-connected steady-state control method is as follows:

the output voltage phase according to step 4) of the above-mentioned off-grid steady-state control method is adjusted to $\phi^*+\delta$, and the on-off of the switch tube of the three-phase inverter circuit is controlled according to step 1) to step 9) of the above-mentioned off-grid steady-state control method, wherein, $\phi^*$ is voltage phase of the three-phase grid detected by the phase locked loop circuit, $\delta=\delta_0\pm\Delta\delta$, with the value range of $\delta_0$ is 0.0001-0.15, $\Delta\delta$ is phase compensation parameter with its calculation formula of $$\Delta\delta = \arctan\dfrac{I_{o1}X' + I_{s1}X''}{U_o + I_{o1}R' + I_{s1}R''} - \arctan\dfrac{I_{o2}X' + I_{s2}X''}{U_o + I_{o2}R' + I_{s2}R''};$$

wherein, $I_{o1}$ and $I_{s1}$ are effective values of output current and grid current of the dual-mode inverter after power change respectively, $I_{o2}$ and $I_{s2}$ are effective values of output current and grid current of the dual-mode inverter before power change respectively, R' is line impedance between the dual-mode inverter and the AC bus, X' is inductive reactance between the dual-mode inverter and the AC bus, and R" is line impedance between the local load and the AC bus, X" is inductive reactance between the local load and the AC bus.

\* \* \* \* \*